US011929043B1

(12) United States Patent
Wang

(10) Patent No.: US 11,929,043 B1
(45) Date of Patent: Mar. 12, 2024

(54) DETECTION CIRCUIT, DETECTION METHOD AND IMAGE PROCESSING SYSTEM FOR LOCAL DIMMING CONTROL

(71) Applicant: NOVATEK Microelectronics Corp., Hsin-Chu (TW)

(72) Inventor: Chun-Hsiang Wang, Tainan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/976,893

(22) Filed: Oct. 31, 2022

(51) Int. Cl.
*G09G 3/34* (2006.01)
*G06F 3/041* (2006.01)

(52) U.S. Cl.
CPC ... *G09G 3/3426* (2013.01); *G09G 2320/0626* (2013.01); *G09G 2320/0646* (2013.01)

(58) Field of Classification Search
CPC ................................................ G02B 2027/014
See application file for complete search history.

(56) References Cited

U.S. PATENT DOCUMENTS

2008/0100645 A1* 5/2008 Nitta .................... G09G 3/3426 345/690
2009/0303346 A1* 12/2009 Kanemitsu ........... G09G 3/3406 348/E5.022
2013/0106680 A1* 5/2013 Mashiba ............. G09G 3/3413 345/102
2015/0003749 A1* 1/2015 Kim ....................... H04N 19/30 382/232
2021/0027722 A1* 1/2021 Rao ....................... G06F 3/0412

* cited by examiner

*Primary Examiner* — Nan-Ying Yang
(74) *Attorney, Agent, or Firm* — Winston Hsu

(57) ABSTRACT

A detection circuit is used for a display controller configured to generate a plurality of backlight data according to a plurality of image data. The detection circuit includes a resize circuit and a comparison circuit. The resize circuit is configured to receive the plurality of image data and convert the plurality of image data into a plurality of region data. The comparison circuit, coupled to the resize circuit, is configured to: receive at least one first region data from the resize circuit; receive at least one first backlight data corresponding to the at least one first region data from the display controller; compare the at least one first region data with the at least one first backlight data to generate a comparison result; and output a control signal to control an output setting of the display controller according to the comparison result.

33 Claims, 10 Drawing Sheets

Image changes but backlight data are stuck

DETECTION CIRCUIT, DETECTION METHOD AND IMAGE PROCESSING SYSTEM FOR LOCAL DIMMING CONTROL

BACKGROUND OF THE INVENTION

1. Field of the Invention

The present invention relates to a detection circuit, and more particularly, to a detection circuit used for backlight control.

2. Description of the Prior Art

Nowadays, local dimming technology is commonly used in a display device. In the local dimming control, the backlight intensity on a panel is adjusted in partition to be adapted to the image content, where the backlight data may be calculated according to the image data. Therefore, the backlight may be turned on only at positions having images, thereby improving the contrast of the display images.

In a vehicle display system, the accuracy of image content is a basic requirement since a wrong display may influence the driving safety. The backlight content is also requested to be accurate if the local dimming control is applied. The accuracy of backlight content is based on whether the backlight data are accurately calculated and accurately delivered to the display driver. The delivery of backlight data may be checked by using an error correcting code (ECC) such as the cyclic redundancy check (CRC).

After long-term usage of the vehicle display system, the aging of the processing circuit and/or interferences might cause an error in the logic circuit for calculating the backlight content. However, as for the backlight controller currently available in the vehicle display system, there is no checking scheme to determine whether the backlight data are accurately calculated. Thus, there is a need for improvement over the prior art.

SUMMARY OF THE INVENTION

It is therefore an objective of the present invention to provide a detection circuit for checking whether the backlight data are accurately calculated, so as to achieve the requirements of driving safety.

An embodiment of the present invention discloses a detection circuit for a display controller. The display controller is configured to generate a plurality of backlight data according to a plurality of image data. The detection circuit comprises a resize circuit and a comparison circuit. The resize circuit is configured to receive the plurality of image data and convert the plurality of image data into a plurality of region data. The comparison circuit, coupled to the resize circuit, is configured to: receive at least one first region data among the plurality of region data from the resize circuit; receive at least one first backlight data corresponding to the at least one first region data among the plurality of backlight data from the display controller; compare the at least one first region data with the at least one first backlight data to generate a comparison result; and output a control signal to control an output setting of the display controller according to the comparison result.

Another embodiment of the present invention discloses a method used in a detection circuit for controlling a display controller. The display controller is configured to generate a plurality of backlight data according to a plurality of image data. The method comprises steps of: receiving the plurality of image data and converting the plurality of image data into a plurality of region data; receiving at least one first region data among the plurality of region data; receiving at least one first backlight data corresponding to the at least one first region data among the plurality of backlight data from the display controller; comparing the at least one first region data with the at least one first backlight data to generate a comparison result; and outputting a control signal to control an output setting of the display controller according to the comparison result.

Another embodiment of the present invention discloses an image processing system, which comprises a display controller and a detection circuit. The display controller is configured to generate a plurality of backlight data according to a plurality of image data. The detection circuit, coupled to the display controller, comprises a resize circuit and a comparison circuit. The resize circuit is configured to receive the plurality of image data and convert the plurality of image data into a plurality of region data. The comparison circuit, coupled to the resize circuit, is configured to: receive at least one first region data among the plurality of region data from the resize circuit; receive at least one first backlight data corresponding to the at least one first region data among the plurality of backlight data from the display controller; compare the at least one first region data with the at least one first backlight data to generate a comparison result; and output a control signal to control an output setting of the display controller according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a detection circuit for controlling a display controller, which may generate backlight data according to image data. The detection circuit may check the accuracy of the backlight data, and thereby control the operations of the display controller. In an application for the vehicle display system, the backlight data are requested to be accurate; hence, the detection circuit serves to determine the accuracy of the backlight data, thereby ensuring the driving safety. In the following embodiments, the display controller may be a local dimming controller as an example, and the detection circuit may be or may include a backlight content monitor (BCM) used for detecting the backlight data and controlling the local dimming functions of the local dimming controller. Note that the implementations of the present invention are not limited thereto. The display controller may be used for any display-related functions, and the detection circuit is a circuit device capable of detecting the output of the display controller. The detection result may further be used for controlling the output setting and/or operation of the display controller.

Figure 1:
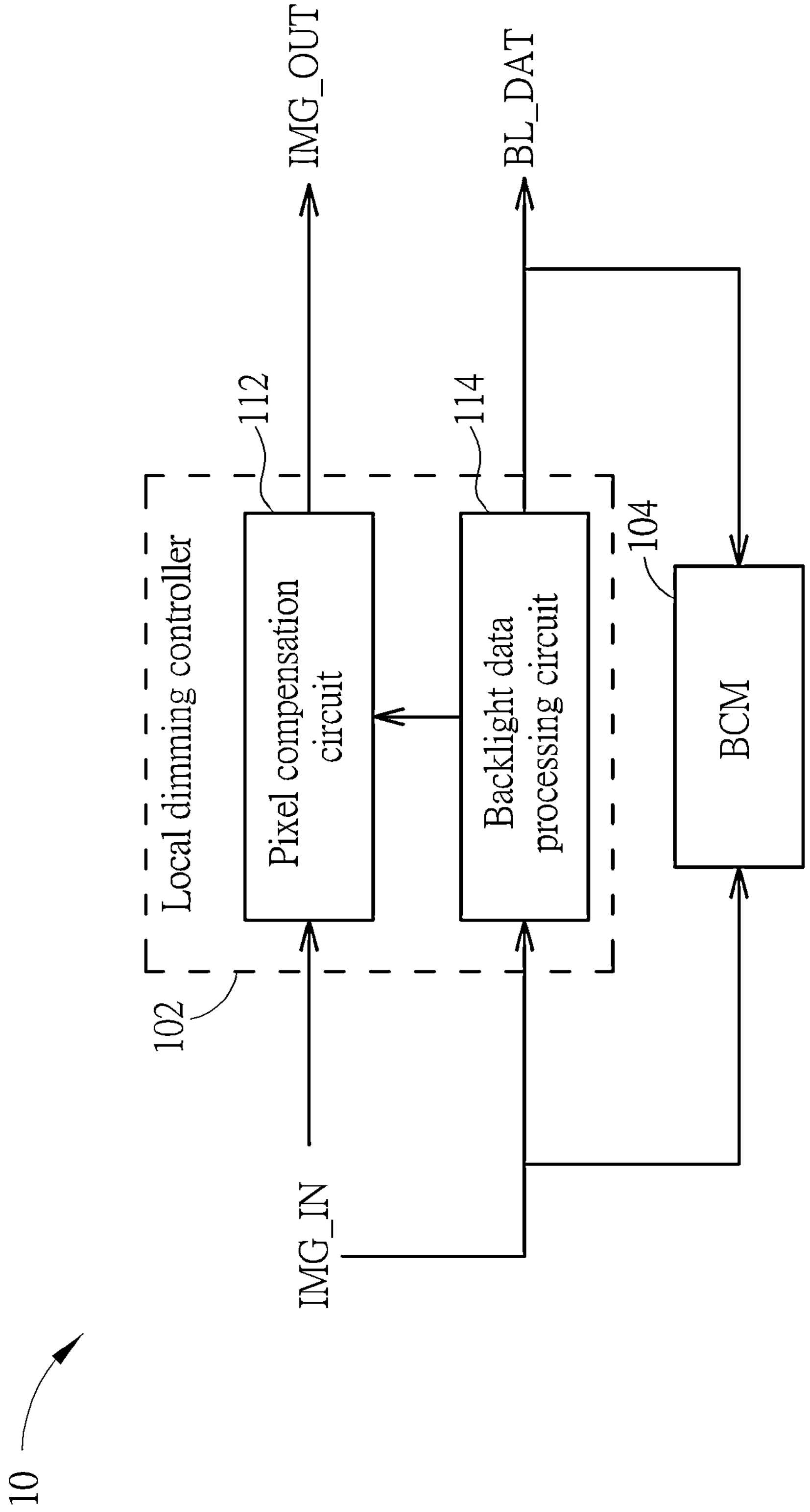
FIG. 1 is a schematic diagram of an image processing system according to an embodiment of the present invention.

FIG. 1 is a schematic diagram of an image processing system 10 according to an embodiment of the present invention. The image processing system 10 is capable of local dimming functions, and thus includes a local dimming controller 102 and a BCM 104. The local dimming controller 102 is configured to receive input image data IMG_IN from an image source, process the input image data IMG_IN to generate output image data IMG_OUT and also generate backlight data BL_DAT for partition backlight control, and then output the output image data IMG_OUT and the backlight data BL_DAT to a display driver and display panel (not illustrated).

In detail, the local dimming controller 102 includes a pixel compensation circuit 112 and a backlight data processing circuit 114. The pixel compensation circuit 112 is configured to perform various data compensation on the image data, such as Mura compensation, voltage drop compensation and brightness adjustment, but not limited thereto. The backlight data processing circuit 114 is configured to calculate the backlight data BL_DAT based on the input image data IMG_IN.

As mentioned above, the backlight data BL_DAT may not be calculated or generated accurately due to aging of the image processing circuits and/or interferences. If the local dimming controller 102 is used to control the backlight of a vehicle display, both the output image data IMG_OUT and the backlight data BL_DAT should be accurate. Otherwise, some important information might not be successfully shown on the dashboard, resulting in dangers on driving. Therefore, the BCM 104 may detect the backlight data BL_DAT, to determine whether the backlight data BL_DAT is accurate, thereby ensuring that the image data can be shown on the display panel accurately. As shown in FIG. 1, the BCM 104 may receive the input image data IMG_IN and also receive the backlight data BL_DAT, to determine whether the input image data IMG_IN and the backlight data BL_DAT have high similarity, so as to determine the accuracy of the backlight data BL_DAT.

Figure 2:
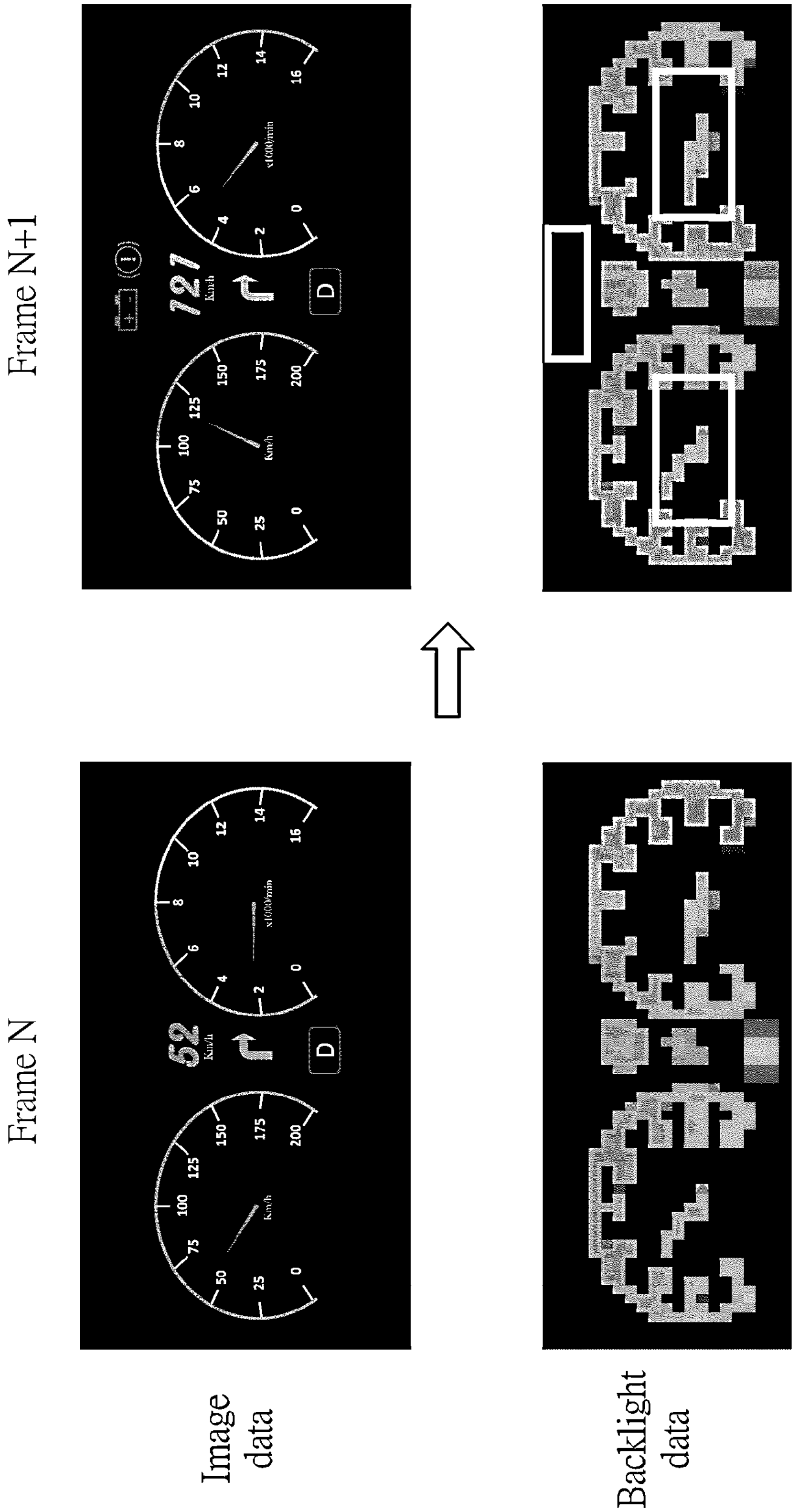
FIG. 2 illustrates a possible error appearing on the backlight data in an exemplary image frame.

FIG. 2 illustrates a possible error appearing on the backlight data in an exemplary image frame, where the display panel is a dashboard showing driving information. In the current image frame (i.e., Frame N), the backlight data are generated based on the corresponding image data, and thus have a similar appearance as the image frame but have a lower resolution. More specifically, the backlight is turned on only at the positions having white images. In the next image frame (i.e., Frame N+1), the image content changes, but the backlight data are stuck, such that the backlight image fails to match the actually displayed image. In such a situation, the image data cannot be accurately shown. For example, as shown in FIG. 2, the pointer of the dashboard may not be successfully shown due to the inaccurate backlight data in Frame N+1. In several embodiments, if a warning icon is not shown accurately, the driver may not be aware of the warning situation, which may result in dangers.

Figure 3:
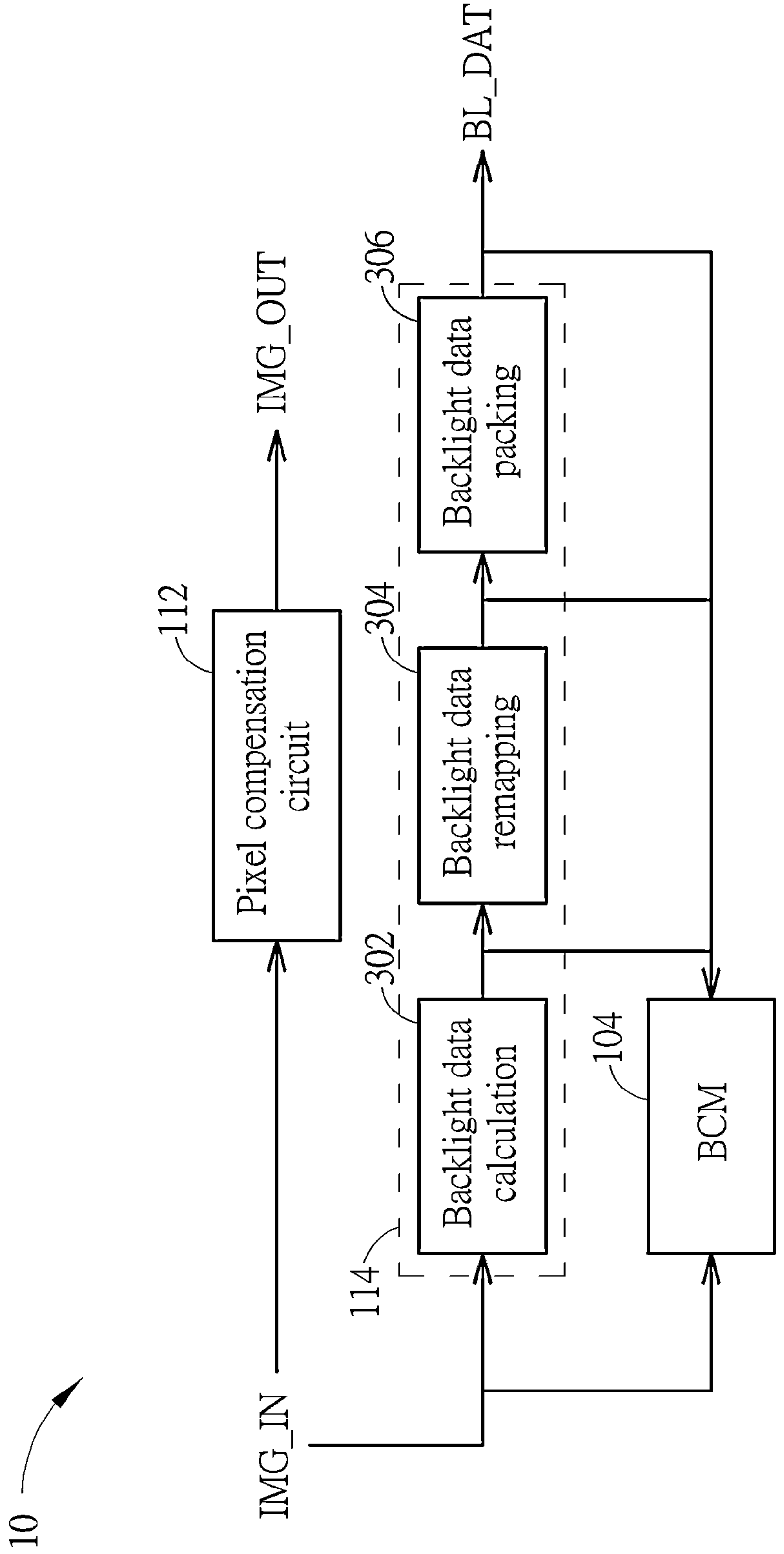
FIG. 3 is a schematic diagram of the image processing system with a detailed implementation of the backlight data processing circuit.

The backlight data received by the BCM 104 may be in any appropriate form. FIG. 3 is a schematic diagram of the image processing system 10 with a detailed implementation of the backlight data processing circuit 114. The backlight data processing circuit 114 includes a backlight data calculation circuit 302, a backlight data remapping circuit 304 and a backlight data packing circuit 306. The backlight data calculation circuit 302 is configured to calculate the backlight data BL_DAT based on the input image data IMG_IN. The backlight data remapping circuit 304 is configured to arrange the backlight data BL_DAT based on the deployment of direct-under backlight sources. The backlight data packing circuit 306 is configured to pack the backlight data BL_DAT to be in a packet format which is receivable and recognizable by the display controller. The backlight data BL_DAT before or after remapping or the backlight data BL_DAT in packets may be received by the BCM 104 for determining their accuracy. Note that the backlight data BL_DAT in the packet format includes additional information such as a header, tail, and/or error correcting codes (ECCs). Therefore, if the BCM 104 receives the backlight data BL_DAT in the packet format, a de-packet circuit may further be applied to extract the backlight data BL_DAT from the packets before accuracy detection for the backlight data BL_DAT.

Figure 4:
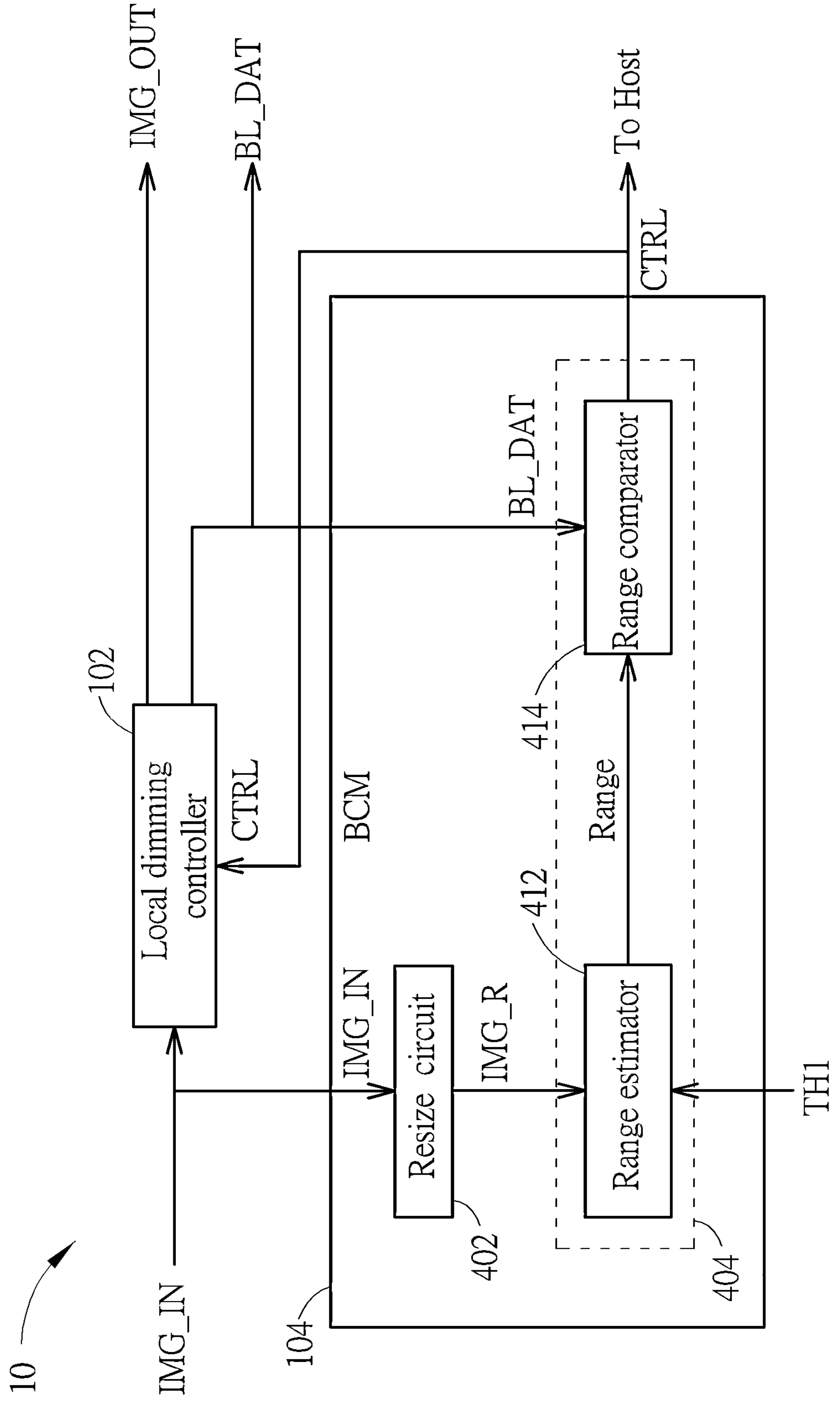
FIG. 4 is a schematic diagram of the image processing system with a detailed implementation of the BCM according to an embodiment of the present invention.

FIG. 4 is a schematic diagram of the image processing system 10 with a detailed implementation of the BCM 104 according to an embodiment of the present invention. The BCM 104 includes a resize circuit 402 and a comparison circuit 404. The resize circuit 402 is configured to receive the input image data IMG_IN and convert the input image data IMG_IN into region data IMG_R. The region data IMG_R should have a smaller size than the input image data IMG_IN, to be adapted to the lower resolution of the backlight data BL_DAT. In such a situation, each of the region data IMG_R may be compared with the corresponding backlight data BL_DAT in a one-to-one mapping. For example, supposing that a frame of input image data IMG_IN include 1920×720 pixels of data and that there are 24×10 backlight data BL_DAT in one frame, the resize circuit 402 may convert the 1920×720 input image data IMG_IN into 24×10 region data IMG_R with the same size/resolution as the backlight data BL_DAT, so as to achieve the one-to-one mapping.

Figure 5:
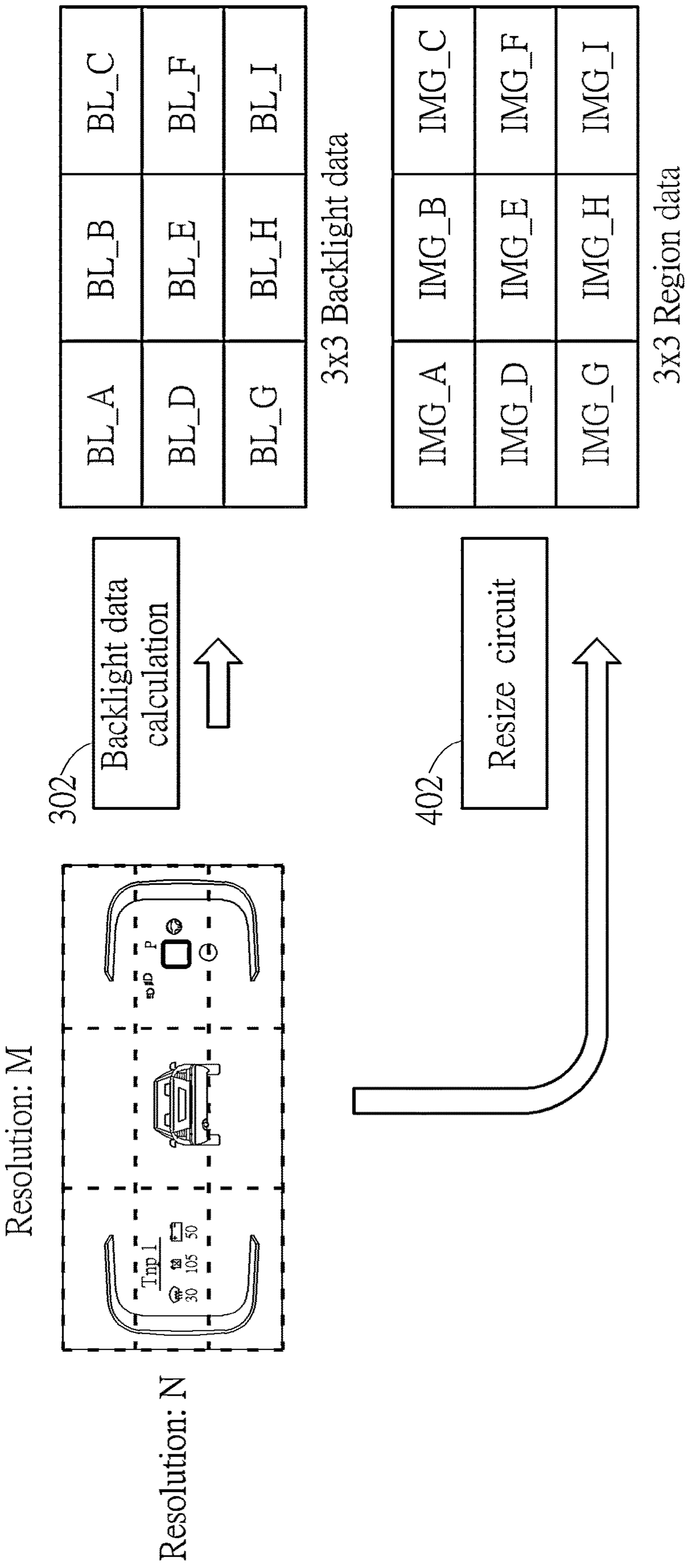
FIG. 5 illustrates the partition of a frame of image data according to an embodiment of the present invention.

In an embodiment, the image frame may be partitioned into multiple regions, where each region is provided with one backlight data for local dimming control, and thus the image data in each region may be converted (e.g., averaged) to generate one region data. FIG. 5 illustrates the partition of a frame of image data according to an embodiment of the present invention. As shown in FIG. 5, the resolution of the image data is M×N, where M and N are integers greater than or equal to 3. In this embodiment, the local dimming may be applied by using a direct-under backlight device having 9 light sources arranged as a 3×3 array, and thus the frame of image data are used to generate 9 backlight data BL_A-BL_I for 3×3 regions on the display panel corresponding to the backlight arrangement (e.g., through the backlight data calculation circuit 302 shown in FIG. 3). Correspondingly, the resize circuit 402 may divide the M×N image data into 9 parts, to respectively generate 9 region data IMG A-IMG_I for the 3×3 regions corresponding to the backlight arrangement.

Therefore, the comparison circuit 404 may receive the region data IMG_R from the resize circuit 402 and also receive the backlight data BL_DAT from the backlight data processing circuit 114, to compare the region data IMG_R with the backlight data BL_DAT in the same region(s). Subsequently, based on the comparison result, the comparison circuit 404 may output a control signal CTRL to the local dimming controller 102, to control an output setting of the local dimming controller 102. For example, if the comparison result indicates that a frame of backlight data BL_DAT are accurate, the comparison circuit 404 may output the control signal CTRL to enable the local dimming output of the local dimming controller 102. Otherwise, if the comparison result indicates that one or several of the backlight data BL_DAT in a frame are inaccurate, the comparison circuit 404 may output the control signal CTRL to disable the local dimming output of the local dimming controller 102. In such a situation, the image processing system 10 may enter another operation mode where all of the backlight sources are turned on without local dimming, to ensure that the image can be displayed accurately.

As shown in FIG. 4, the control signal CTRL may be output to the local dimming controller 102 to control its local dimming operation. Alternatively or additionally, the control signal CTRL may be output to a host in the front end. The host may instruct the local dimming controller 102 to disable the local dimming operation. In an embodiment, the host may also deliver a related warning indication or message to the user, e.g., the vehicle driver.

In this embodiment, the comparison circuit 404 may compare the region data IMG_R with the backlight data BL_DAT through range comparison. In detail, the comparison circuit 404 includes a range estimator 412 and a range comparator 414. The range estimator 412 is configured to estimate a backlight data range according to one of the region data IMG_R, where a threshold value TH1 is applied to determine the backlight data range. The range comparator 414 is configured to determine whether a backlight data BL_DAT corresponding to this region data IMG_R is within the backlight data range.

Figure 6:
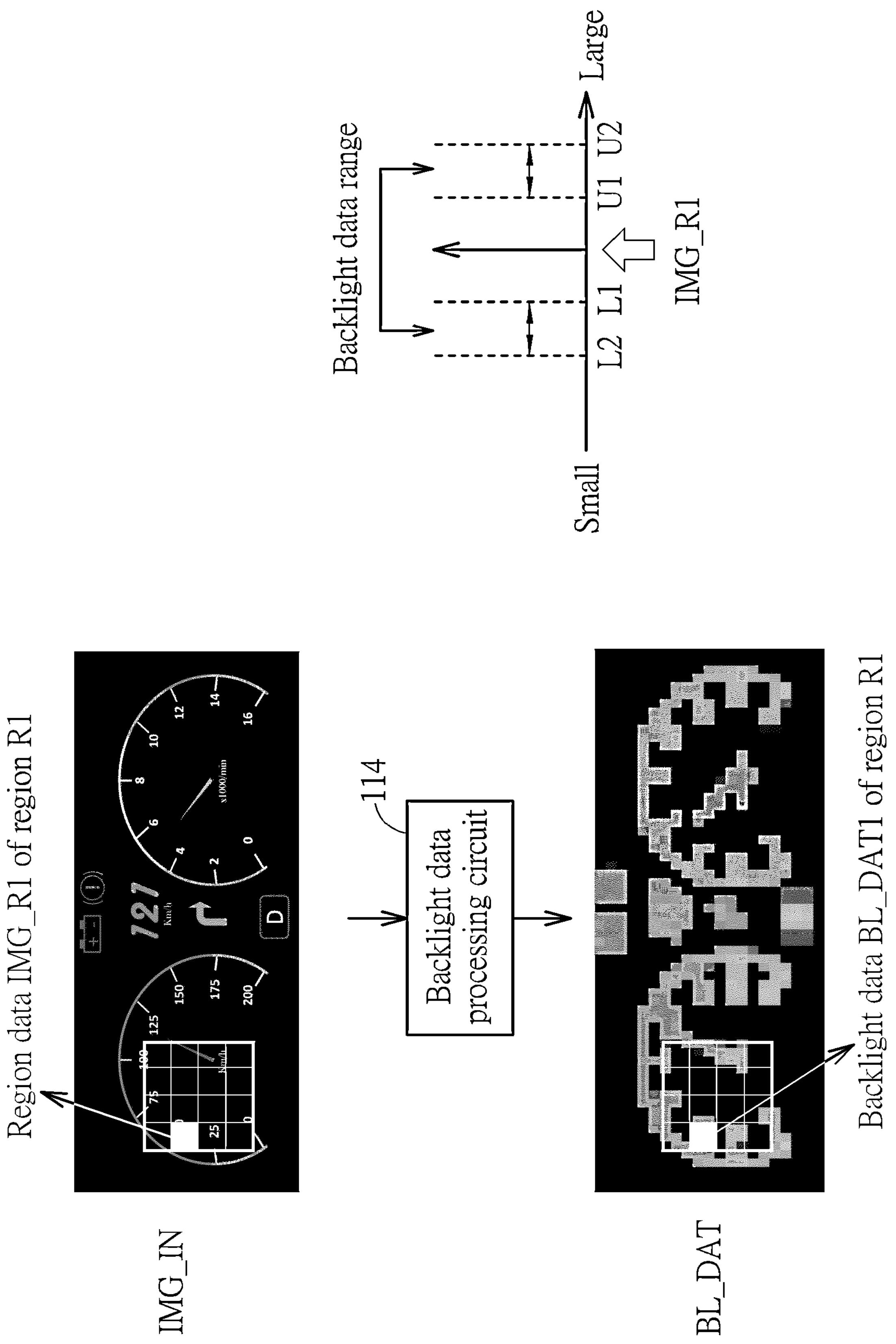
FIG. 6 illustrates a detailed implementation for determining the backlight data range according to an embodiment of the present invention.

FIG. 6 illustrates a detailed implementation for determining the backlight data range according to an embodiment of the present invention. As shown in FIG. 6, the input image data IMG_IN are used to generate the backlight data BL_DAT through the backlight data processing circuit 114. After resizing, the input image data IMG_IN are also converted into the region data IMG_R, where each region data corresponds to a region or block. A specific region R1 has a region data IMG_R1 and a backlight data BL_DAT1, which are compared with each other. In this embodiment, a backlight data range is generated based on the value of the region data IMG_R1. The backlight data range has an upper limit and a lower limit, which may be set according to the threshold value TH1; that is, the threshold value TH1 may be used as a criterion for determining the interval between the region data IMG_R1 and the upper and/or lower limit. As shown in FIG. 4, the range estimator 412 receives the threshold value TH1, which is from the host or a register in the local dimming controller 102, and applies the threshold value TH1 to determine the upper limit and/or the lower limit.

For example, as shown in FIG. 6, the backlight data range may center on the value of the region data IMG_R1 with a range size, which may be determined based on a threshold voltage such as the threshold value TH1 shown in FIG. 4, where a lower threshold value may lead to a smaller backlight data range defined by an upper limit U1 and a lower limit L1, and a higher threshold value may lead to a larger backlight data range defined by an upper limit U2 and a lower limit L2. Based on system requirements, the host may determine the sensitivity and/or tolerance of the accuracy detection, and thereby set an appropriate threshold value for generating suitable upper/lower limits of the backlight data range.

After the backlight data range is set up, the range comparator 414 determines whether the backlight data BL_DAT1 is within the backlight data range, so as to determine whether the backlight data BL_DAT1 is accurate.

As mentioned above, the image frame is partitioned into multiple regions based on local dimming control, and each region data and each backlight data correspond to one region. In an embodiment, the region data IMG_R of the entire image frame are received by the comparison circuit 404 to be compared with the corresponding backlight data BL_DAT, to determine the accuracy of the backlight data BL_DAT of the overall image frame. In another embodiment, in order to improve the operation efficiency, only parts of the region data IMG_R and corresponding parts of the backlight data BL_DAT are received and compared by the comparison circuit 404. The host may provide appropriate settings to flexibly configure the comparison circuit 404 to perform comparison on specific region(s).

For example, supposing that there are 24×10 region data and 24×10 corresponding backlight data in one image frame, the comparison circuit 404 may only compare 3×3 region data with corresponding 3×3 backlight data in specific regions, to determine the accuracy of backlight data of this image frame. In the dashboard as shown in FIG. 6, the regions for comparison may mainly include those regions showing the pointer that may usually change during driving and/or those regions showing important warning indications. If said regions have accurate backlight data, the local dimming function may be feasible without influencing the driving safety.

Figure 7:
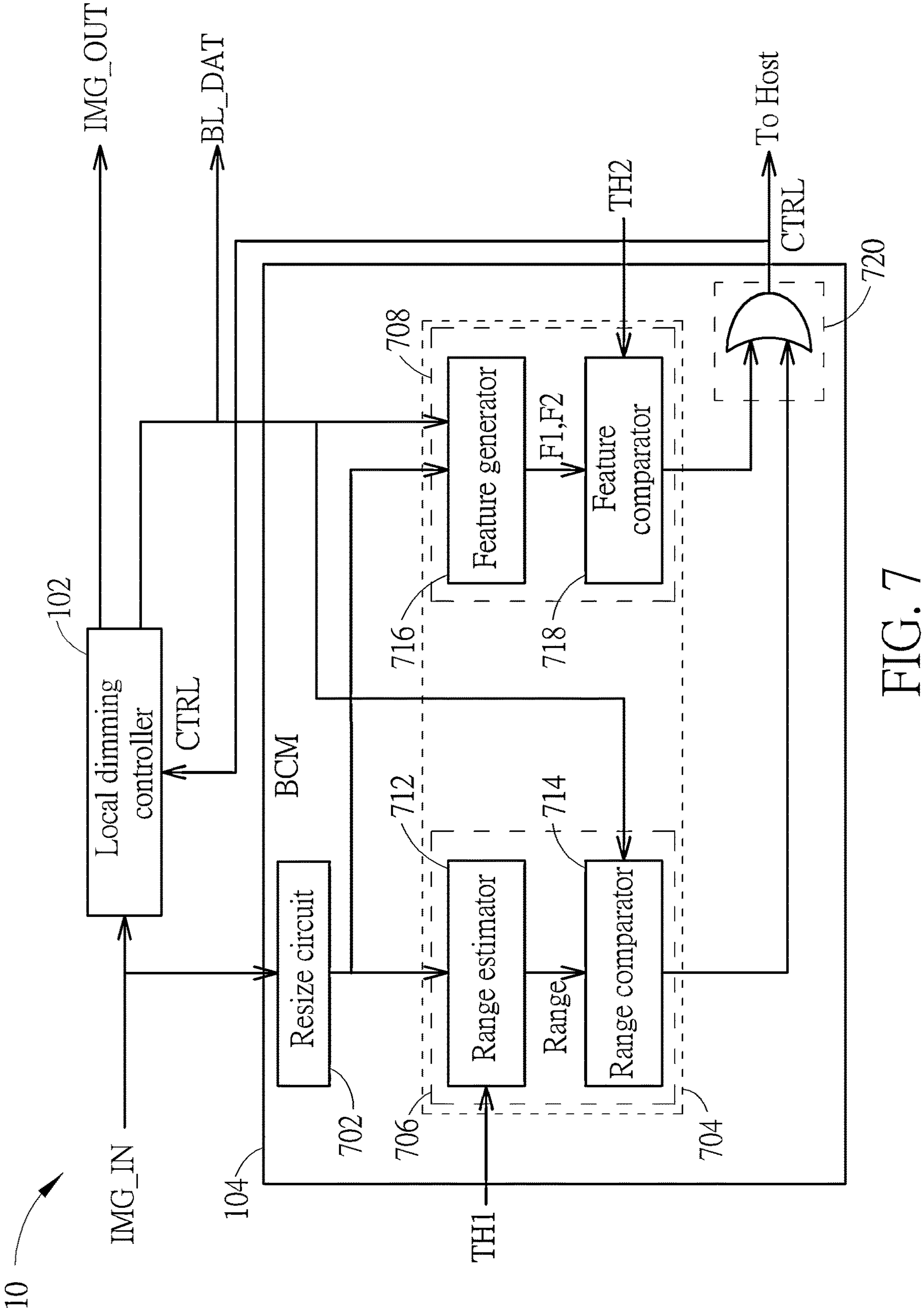
FIG. 7 is a schematic diagram of the image processing system with another detailed implementation of the BCM according to an embodiment of the present invention.

In another embodiment, the comparison circuit of the BCM may apply multiple comparison schemes to make the comparison results more precise. FIG. 7 is a schematic diagram of the image processing system 10 with another detailed implementation of the BCM 104 according to an embodiment of the present invention. As shown in FIG. 7, the BCM 104 includes a resize circuit 702 and a comparison circuit 704. The implementations and operations of the resize circuit 702 are similar to those of the resize circuit 402 described above, and will not be narrated herein. The comparison circuit 704 includes two comparison sub-circuits, which are a range comparison sub-circuit 706 and a feature comparison sub-circuit 708. The implementations and operations of the range comparison sub-circuit 706 are similar to those of the comparison circuit 404, where the range estimator 712 operates similarly as the range estimator 412, and the range comparator 714 operates similarly as the range comparator 414.

The feature comparison sub-circuit 708 compares the features of the input image data IMG_IN and the backlight data BL_DAT to determine whether the backlight data BL_DAT is accurate. More specifically, the feature comparison sub-circuit 708 includes a feature generator 716 and a feature comparator 718. The feature generator 716 is configured to generate a feature value F1 of the input image data IMG_IN and a feature value F2 of the backlight data BL_DAT, and output the feature values F1 and F2 to the feature comparator 718. Therefore, the feature comparator 718 may determine the similarity of the feature values F1 and F2, so as to generate a comparison result indicating whether the backlight data BL_DAT is accurate. In addition, as shown in FIG. 7, the feature comparator 718 may further receive a threshold value TH2 from the host or the local dimming controller 102. The threshold value TH2 is used to determine the sensitivity and/or tolerance associated with the feature comparison.

Each of the feature values F1 and F2 may be, but not limited to, a frequency feature value, a magnitude feature value or a corner value. If the frequency feature values are used, an array of the input image data IMG_IN may be applied with the discrete cosine transform (DCT) to be converted into frequency data, which are further compared with the frequency data corresponding to the backlight data BL_DAT converted through the DCT technique. For example, supposing that there are 24×10 region data IMG_R and 24×10 backlight data BL_DAT in one frame, the DCT operation may take 8×8 region data to be converted into frequency domain, to generate multiple coefficients throughout a range of frequencies. Similarly, the DCT operation may also take 8×8 backlight data in the same regions to be converted into frequency domain, to generate multiple coefficients throughout the same range of frequencies. Therefore, the coefficient(s) in one or more frequency components may be compared, to determine the similarity of the input image data IMG_IN and the backlight data BL_DAT.

In another embodiment, the feature values F1 and F2 may be magnitude feature values represented by binary values. The feature generator 716 may generate a local binary pattern (LBP) of the input image data IMG_IN and the backlight data BL_DAT, and the feature comparator 718 may compare the similarity of the LBP in specific region(s) of the input image data IMG_IN and the LBP in the corresponding region (s) of the backlight data BL_DAT. Alternatively, the feature comparison sub-circuit 708 may apply the Harris corner detection method to determine the corner values in specific region (s) of the input image data IMG_IN and the corresponding region(s) of the backlight data BL_DAT, so as to determine their similarity.

As shown in FIG. 7, the comparison results of the feature comparison sub-circuits 706 and 708 are both output to a logic combiner circuit 720, which may be implemented with an "OR" gate. The logic combiner circuit 720 may output the control signal CTRL to the host and/or the local dimming controller 102 according to the comparison results of the comparison sub-circuits 706 and 708. Supposing that the value "0" indicates an accurate result and the value "1" indicates an inaccurate result (i.e., abnormal case), with the implementation of the "OR" gate, if each of the comparison sub-circuits 706 and 708 determines that the backlight data BL_DAT are accurate, the control signal CTRL may enable the local dimming output of the local dimming controller 102. Otherwise, if any of the comparison sub-circuits 706 and 708 determines that the backlight data BL_DAT are inaccurate, the comparison circuit 704 may determine that this is an abnormal case, and output the control signal CTRL to disable the local dimming output of the local dimming controller 102. In such a situation, the image processing system 10 may enter another operation mode where all of the backlight sources are turned on without local dimming, to ensure that the image can be displayed accurately.

Figure 8:
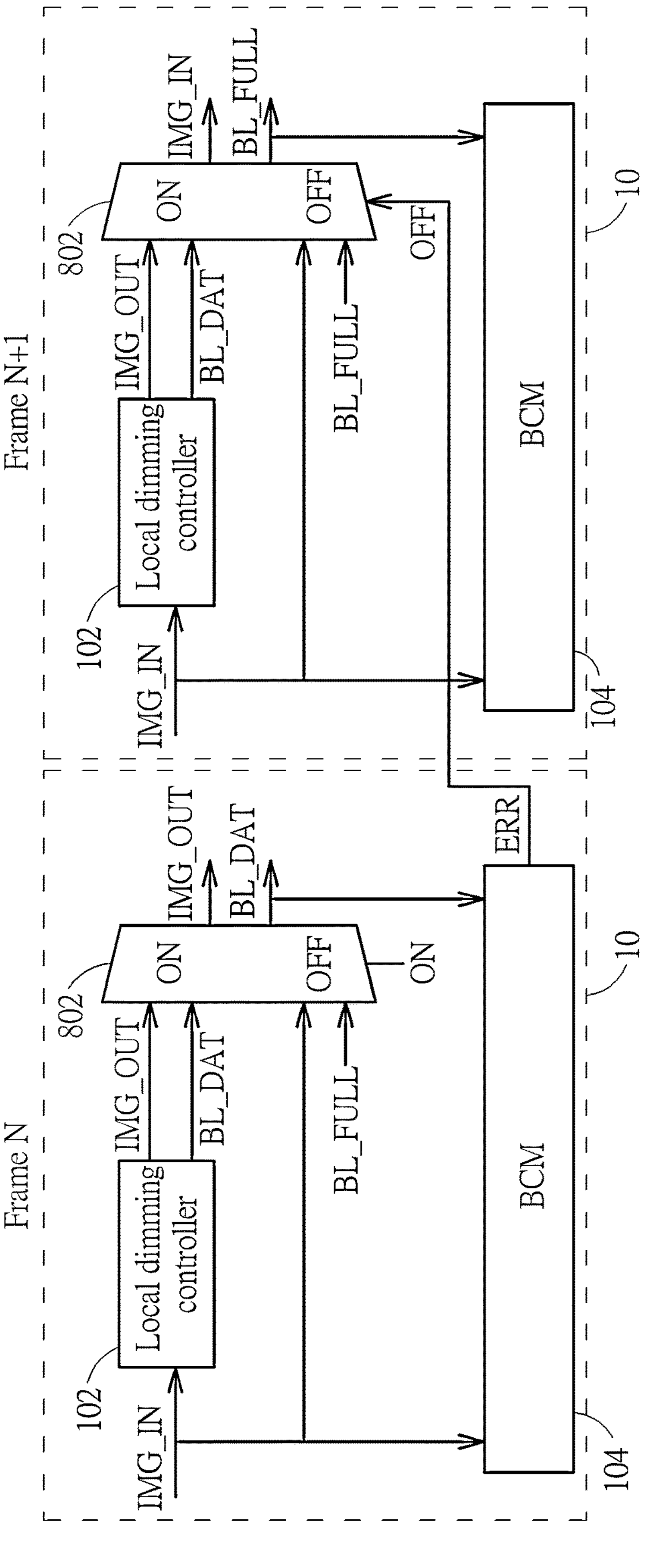
FIG. 8 is a schematic diagram of using the BCM to disable the local dimming output according to an embodiment of the present invention.

FIG. 8 is a schematic diagram of using the BCM 104 to disable the local dimming output according to an embodiment of the present invention. FIG. 8 illustrates the operations of the image processing system 10 in a current image frame (i.e., Frame N) and a next image frame (i.e., Frame N+1), where the local dimming controller 102 is further coupled to a multiplexer (MUX) 802 to control its enablement. In this embodiment, the BCM 104 may detect the accuracy of the backlight data BL_DAT based on the input image data IMG_IN of the current input frame. With a certain processing time, the BCM 104 may generate the comparison result indicating whether the backlight data BL_DAT corresponding to the current input frame is accurate, and output a control signal to control the output setting associated with local dimming for the next image frame.

In this embodiment, the local dimming output of the local dimming controller 102 is enabled (i.e., turned on) in Frame N. In the frame period of Frame N, the BCM 104 may determine that the backlight data BL_DAT is inaccurate, and thereby output an error signal ERR to the MUX 802, to turn off the local dimming output in Frame N+1. In such a situation, the MUX 802 may output a full backlight duty data BL_FULL, instead of the backlight data BL_DAT having local dimming control, to the display panel for displaying the image data of Frame N+1. The full backlight duty data BL_FULL refers to the maximum turn-on duty cycle in every backlight source of the backlight module, which ensures that the user or driver can see the entire image content.

In addition, when the local dimming output is disabled or turned off in Frame N+1, the MUX 802 may output the input image data IMG_IN, instead of the output image data IMG_OUT, to the display driver or the display panel. In general, the local dimming output may decrease the overall brightness of the display panel, and thus the local dimming controller 102 may provide adequate brightness boost for the image data to compensation for this phenomenon. Therefore, if the MUX 802 outputs the full backlight duty data BL_FULL in a frame period, it may preferably output the input image data IMG_IN without being compensated in this frame period, so as to keep the brightness constant.

Figure 9:
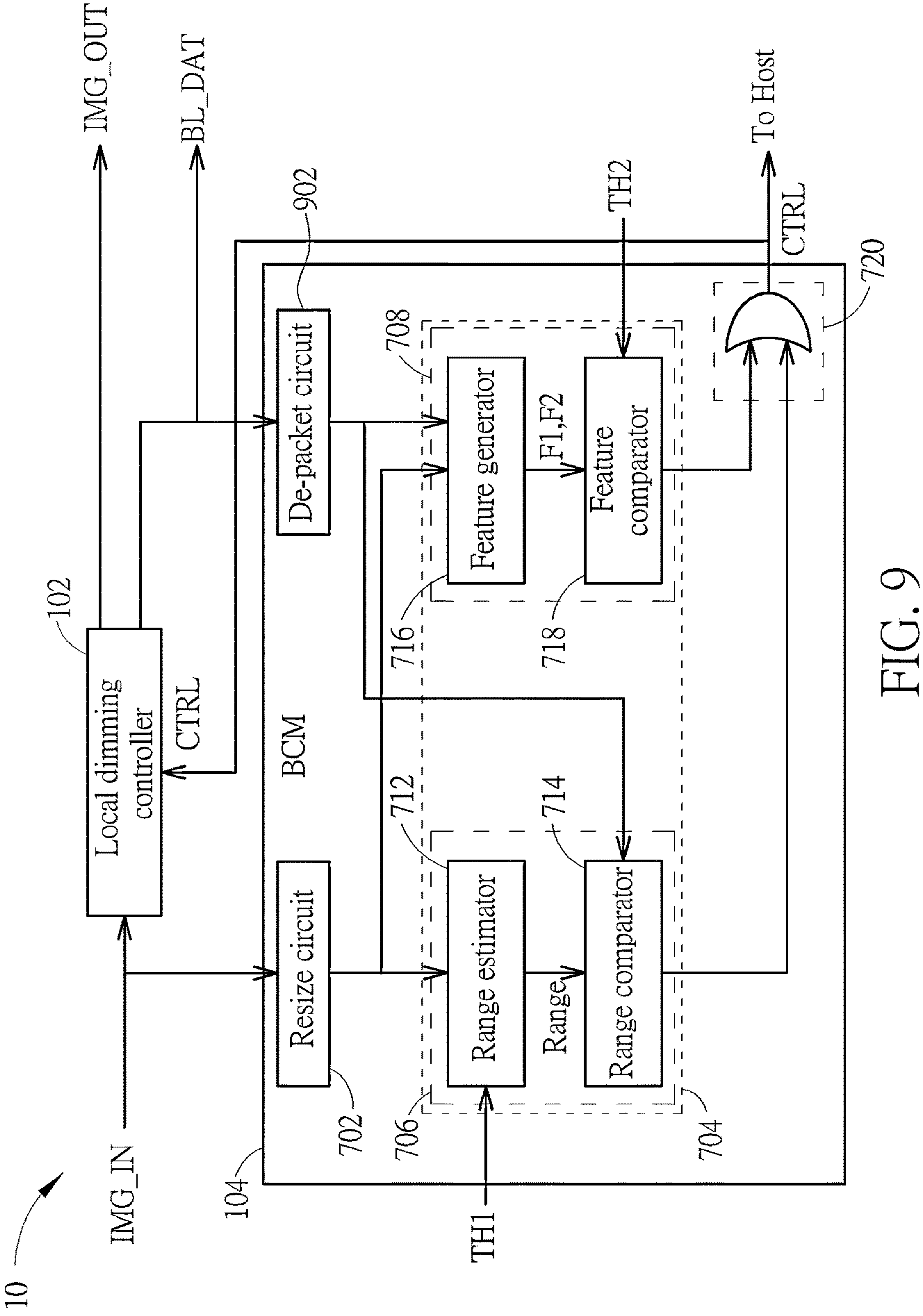
FIG. 9 is a schematic diagram of the image processing system with a further detailed implementation of the BCM according to an embodiment of the present invention.

Referring back to FIG. 3, the BCM 104 may receive the backlight data BL_DAT before or after packing of the backlight data packing circuit 306. If the backlight data BL_DAT before packing are received, they may be directly processed by the BCM 104 as shown in FIG. 4 or 7. If the backlight data BL_DAT after packing are received, the BCM 104 may further perform a de-packing operation before data comparison. FIG. 9 is a schematic diagram of the image processing system 10 with a further detailed implementation of the BCM 104 according to an embodiment of the present invention. The structure of the BCM 104 shown in FIG. 9 is similar to the structure of the BCM 104 shown in FIG. 7, except that the BCM 104 of FIG. 9 further includes a de-packet circuit 902 at the input terminal for receiving the backlight data BL_DAT. The de-packet circuit 902 is configured to receive the backlight data packet from the backlight data packing circuit 306 of the backlight data processing circuit 114 of the local dimming controller 102, and obtain the backlight data BL_DAT from the backlight data packet by removing the packet header, ECCs, and/or other packet information. The de-packet circuit 902 then outputs the extracted backlight data BL_DAT to the comparison circuit 704 for determining their accuracy. Other implementations of the BCM 104 shown in FIG. 9 are similar to those shown in FIG. 7, and will not be repeated herein.

Similarly, the BCM 104 shown in FIG. 4 (using the range comparison method only) may also process the backlight data packet by incorporating a de-packet circuit. The detailed implementations are similar to those described above, and thus omitted herein.

Note that the operations of the BCM may be controlled flexibly. In an embodiment, the user may control whether to enable the backlight detection function of the BCM. For example, in the application of vehicle display, the image processing system may have an operation mode where the BCM is enabled at the night and disabled during the day, and the driver may switch the system between different operation modes.

The present invention aims at providing a BCM applied to an image processing system having local dimming functions, for determining the accuracy of backlight data. Those skilled in the art may make modifications and alterations accordingly. For example, the accuracy of backlight data is detected by comparing the backlight data with the image data (i.e., region data after resizing). In the above embodiments, the range comparison method may be applied individually or along with the feature comparison method. In another embodiment, other comparison methods or detection methods may also be applied, which are not limited to those described in this disclosure. In addition, more than two comparison schemes may be applied and their comparison results are combined to further enhance the sensitivity of backlight accuracy detection.

Further, in the above embodiment, a region data IMG_R is used to generate a backlight data range, to determine whether the corresponding backlight data BL_DAT is within the range, so as to determine the accuracy of the backlight data BL_DAT. In another embodiment, the backlight data BL_DAT may be used to generate an image data range, to determine whether the corresponding region data or image data is within the range. In other words, the roles played by the backlight data BL_DAT and the region data IMG_R in the embodiment illustrated in FIG. 6 may be interchanged, and the related comparison is still feasible. In such a situation, the accuracy of the backlight data BL_DAT may also be detected.

The BCM of the present invention may be realized by means of hardware, software or firmware included in an electronic system. Examples of hardware may include analog, digital and mixed circuits implemented in a silicon chip or microchip. Examples of software may be an algorithm accessed and executed by a processing circuit. In the above embodiment, the BCM may be applied to a vehicle display system, where display accuracy is an important issue for the purpose of increasing driving safety. Note that the BCM of the present invention is applicable to any display system having local dimming functions. As long as the display system includes a detect circuit capable of detecting the accuracy of backlight control, the related implementations should belong to the scope of the present invention.

Figure 10:
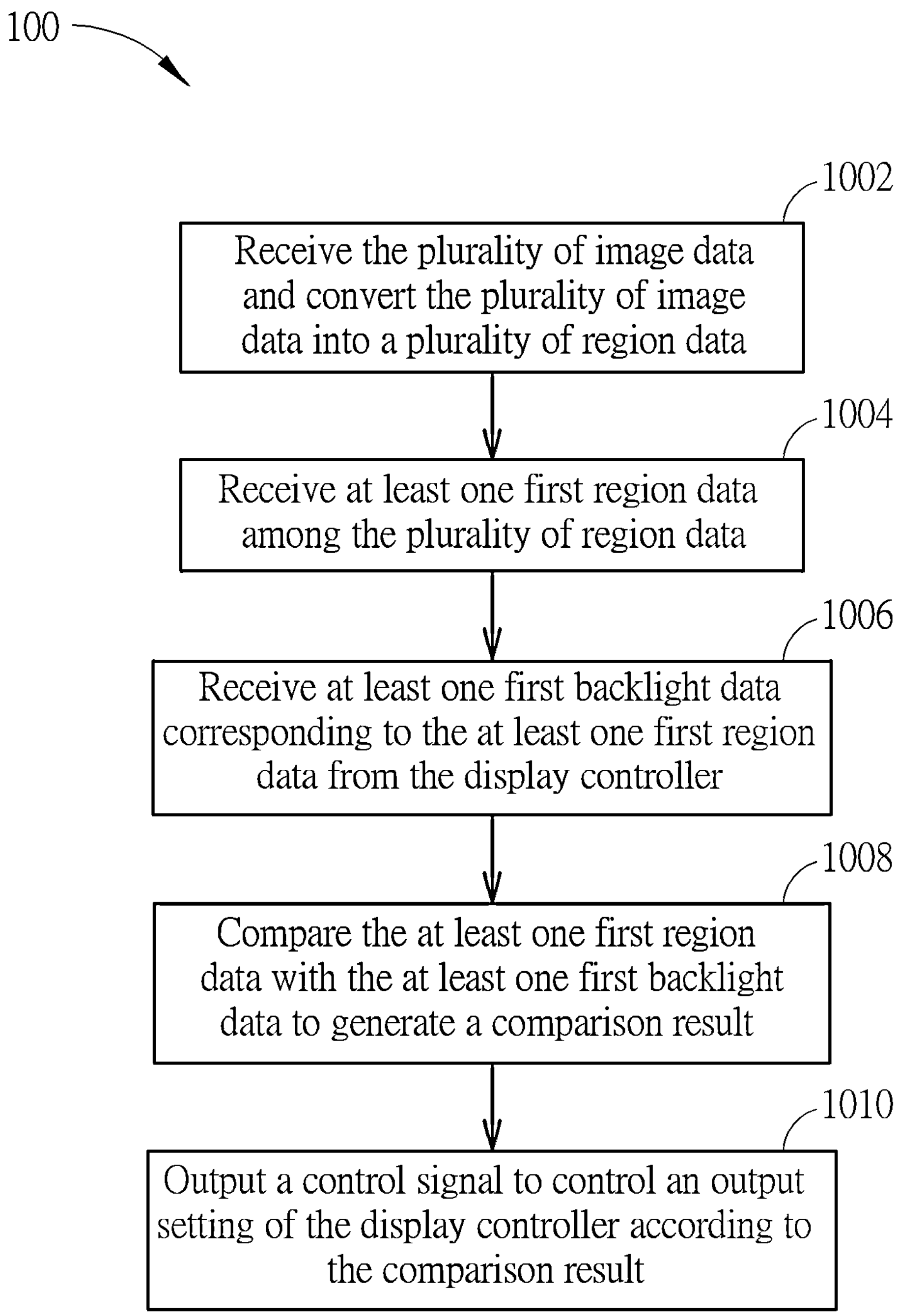
FIG. 10 is a flowchart of a process according to an embodiment of the present invention.

The above operations of the BCM may be summarized into a process 100, as shown in FIG. 10. The process 100 may be implemented in a detection circuit used for a display controller such as the BCM 104 of the local dimming controller 102 shown in FIG. 1, for detecting the accuracy of the backlight data generated by the display controller. As shown in FIG. 10, the process 100 includes the following steps:

Step 1002: Receive the plurality of image data and convert the plurality of image data into a plurality of region data.

Step 1004: Receive at least one first region data among the plurality of region data.

Step 1006: Receive at least one first backlight data corresponding to the at least one first region data from the display controller.

Step 1008: Compare the at least one first region data with the at least one first backlight data to generate a comparison result.

Step 1010: Output a control signal to control an output setting of the display controller according to the comparison result.

The detailed implementations and operations of the process 100 are illustrated in the above descriptions, and will not be narrated hereinafter.

To sum up, the present invention provides a detection circuit used for backlight control, such as a BCM used for detecting the accuracy of backlight data when local dimming is applied. As for a vehicle display system, it is necessary to ensure the display accuracy. Especially when the local dimming is performed, the backlight should be accurately controlled to allow the driver to see correct information when driving. In the local dimming controller, a backlight data calculation circuit is applied to calculate the backlight data based on the image data. The BCM may receive the backlight data and compare the backlight data with the image data, to determine whether the backlight data are accurate. If the backlight data are not accurate, the local dimming output may be disabled, and the local dimming controller may output full backlight duty data to fully turn on all the backlight sources, which ensures that the image data can be fully displayed without being influenced by wrong backlight control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection circuit for a display controller, the display controller being configured to generate a plurality of backlight data according to a plurality of image data, the detection circuit comprising:

a resize circuit, configured to receive the plurality of image data and convert the plurality of image data into a plurality of region data; and a comparison circuit, coupled to the resize circuit, configured to:

receive at least one first region data among the plurality of region data from the resize circuit;

receive at least one first backlight data corresponding to the at least one first region data among the plurality of backlight data from a backlight data processing circuit of the display controller;

compare the at least one first region data with the at least one first backlight data to generate a comparison result, wherein one of the at least one first region data corresponding to a first region of a display panel is compared with one of the at least one first backlight data in the first region; and output a control signal to control an output setting of the display controller according to the comparison result.

2. The detection circuit of claim 1, further comprising:

a de-packet circuit, coupled to the comparison circuit, configured to receive a backlight data packet from the display controller, obtain the at least one first backlight data from the backlight data packet, and output the at least one first backlight data to the comparison circuit.

3. The detection circuit of claim 1, wherein the comparison circuit comprises a range comparison sub-circuit, which comprises:

a range estimator, configured to estimate a backlight data range according to one of the at least one first region data; and a range comparator, coupled to the range estimator, configured to determine whether one of the at least one first backlight data corresponding to the one of the at least one first region data is within the backlight data range.

4. The detection circuit of claim 3, wherein the range comparison sub-circuit is configured to receive a threshold value, and set at least one of an upper limit and a lower limit of the backlight data range according to the threshold value.

5. The detection circuit of claim 1, wherein the comparison circuit comprises a feature comparison sub-circuit, which comprises:

a feature generator, configured to generate a first feature value of the at least one first region data and a second feature value of the at least one first backlight data; and a feature comparator, coupled to the feature generator, configured to determine a similarity of the first feature value and the second feature value to generate the comparison result.

6. The detection circuit of claim 5, wherein each of the first feature value and the second feature value is a frequency feature value, a magnitude feature value or a corner value.

7. The detection circuit of claim 1, wherein the comparison circuit is configured to output the control signal to enable a local dimming output of the display controller when the comparison result indicates that the plurality of backlight data are accurate, or output the control signal to disable the local dimming output when the comparison result indicates that the plurality of backlight data are inaccurate.

8. The detection circuit of claim 7, wherein the comparison circuit comprises a plurality of comparison sub-circuits, and the control signal output by the comparison circuit enables the local dimming output when each of the plurality of comparison sub-circuits determines that the plurality of backlight data are accurate, or the control signal output by the comparison circuit disables the local dimming output when at least one of the plurality of comparison sub-circuits determines that the plurality of backlight data are inaccurate.

9. The detection circuit of claim 1, wherein the detection circuit is configured to output the control signal to control the output setting for a second image frame according to the plurality of image data of a first image frame previous to the second image frame.

10. The detection circuit of claim 1, wherein the plurality of region data corresponds to the plurality of backlight data in a one-to-one mapping.

11. The detection circuit of claim 1, wherein the detection circuit comprises a backlight content monitor (BCM).

12. A method used in a detection circuit for controlling a display controller, the display controller being configured to generate a plurality of backlight data according to a plurality of image data, the method comprising:

receiving the plurality of image data and converting the plurality of image data into a plurality of region data;

receiving at least one first region data among the plurality of region data;

receiving at least one first backlight data corresponding to the at least one first region data among the plurality of backlight data from a backlight data processing circuit of the display controller;

comparing the at least one first region data with the at least one first backlight data to generate a comparison result, wherein one of the at least one first region data corresponding to a first region of a display panel is compared with one of the at least one first backlight data in the first region; and outputting a control signal to control an output setting of the display controller according to the comparison result.

13. The method of claim 12, further comprising:

receiving a backlight data packet from the display controller; and obtaining the at least one first backlight data from the backlight data packet.

14. The method of claim 12, wherein the step of comparing the at least one first region data with the at least one first backlight data to generate the comparison result comprises:

estimating a backlight data range according to one of the at least one first region data; and determining whether one of the at least one first backlight data corresponding to the one of the at least one first region data is within the backlight data range.

15. The method of claim 14, further comprising:

receiving a threshold value; and setting at least one of an upper limit and a lower limit of the backlight data range according to the threshold value.

16. The method of claim 12, wherein the step of comparing the at least one first region data with the at least one first backlight data to generate the comparison result comprises:

generating a first feature value of the at least one first region data and a second feature value of the at least one first backlight data; and determining a similarity of the first feature value and the second feature value to generate the comparison result.

17. The method of claim 16, wherein each of the first feature value and the second feature value is a frequency feature value, a magnitude feature value or a corner value.

18. The method of claim 12, wherein the step of outputting the control signal to control the output setting of the display controller according to the comparison result comprises:

outputting the control signal to enable a local dimming output of the display controller when the comparison result indicates that the plurality of backlight data are accurate, or outputting the control signal to disable the local dimming output when the comparison result indicates that the plurality of backlight data are inaccurate.

19. The method of claim 18, wherein the step of comparing the at least one first region data with the at least one first backlight data is performed by using a plurality of comparison sub-circuits, and the control signal enables the local dimming output when each of the plurality of comparison sub-circuits determines that the plurality of backlight data are accurate, or the control signal disables the local dimming output when at least one of the plurality of comparison sub-circuits determines that the plurality of backlight data are inaccurate.

20. The method of claim 12, wherein the detection circuit is configured to output the control signal to control the output setting for a second image frame according to the plurality of image data of a first image frame previous to the second image frame.

21. The method of claim 12, wherein the plurality of region data corresponds to the plurality of backlight data in a one-to-one mapping.

22. The method of claim 12, wherein the detection circuit comprises a backlight content monitor (BCM).

23. An image processing system, comprising:

a display controller, configured to generate a plurality of backlight data according to a plurality of image data; and a detection circuit, coupled to the display controller, comprising:

a resize circuit, configured to receive the plurality of image data and convert the plurality of image data into a plurality of region data; and a comparison circuit, coupled to the resize circuit, configured to:

receive at least one first region data among the plurality of region data from the resize circuit;

receive at least one first backlight data corresponding to the at least one first region data among the plurality of backlight data from a backlight data processing circuit of the display controller;

compare the at least one first region data with the at least one first backlight data to generate a comparison result, wherein one of the at least one first region data corresponding to a first region of a display panel is compared with one of the at least one first backlight data in the first region; and output a control signal to control an output setting of the display controller according to the comparison result.

24. The image processing system of claim 23, wherein the detection circuit further comprises:

a de-packet circuit, coupled to the comparison circuit, configured to receive a backlight data packet from the display controller, obtain the at least one first backlight data from the backlight data packet, and output the at least one first backlight data to the comparison circuit.

25. The image processing system of claim 23, wherein the comparison circuit comprises a range comparison sub-circuit, which comprises:

a range estimator, configured to estimate a backlight data range according to one of the at least one first region data; and a range comparator, coupled to the range estimator, configured to determine whether one of the at least one first backlight data corresponding to the one of the at least one first region data is within the backlight data range.

26. The image processing system of claim 25, wherein the range comparison sub-circuit is configured to receive a threshold value, and set at least one of an upper limit and a lower limit of the backlight data range according to the threshold value.

27. The image processing system of claim 23, wherein the comparison circuit comprises a feature comparison sub-circuit, which comprises:

a feature generator, configured to generate a first feature value of the at least one first region data and a second feature value of the at least one first backlight data; and a feature comparator, coupled to the feature generator, configured to determine a similarity of the first feature value and the second feature value to generate the comparison result.

28. The image processing system of claim 27, wherein each of the first feature value and the second feature value is a frequency feature value, a magnitude feature value or a corner value.

29. The image processing system of claim 23, wherein the comparison circuit is configured to output the control signal to enable a local dimming output of the display controller when the comparison result indicates that the plurality of backlight data are accurate, or output the control signal to disable the local dimming output when the comparison result indicates that the plurality of backlight data are inaccurate.

30. The image processing system of claim 29, wherein the comparison circuit comprises a plurality of comparison sub-circuits, and the control signal output by the comparison circuit enables the local dimming output when each of the plurality of comparison sub-circuits determines that the plurality of backlight data are accurate, or the control signal output by the comparison circuit disables the local dimming output when at least one of the plurality of comparison sub-circuits determines that the plurality of backlight data are inaccurate.

31. The image processing system of claim 23, wherein the detection circuit is configured to output the control signal to control the output setting for a second image frame according to the plurality of image data of a first image frame previous to the second image frame.

32. The image processing system of claim 23, wherein the plurality of region data corresponds to the plurality of backlight data in a one-to-one mapping.

33. The image processing system of claim 23, wherein the detection circuit comprises a backlight content monitor (BCM).

* * * * *